United States Patent [19]
Liu

[11] Patent Number: 5,168,601
[45] Date of Patent: Dec. 8, 1992

[54] ADJUSTABLE BABY CART HANDRAIL POSITIONING DEVICE

[76] Inventor: Kun-Hei Liu, 2F., No. 32, Lane 200, Tung Hwa Street, Taipei, Taiwan

[21] Appl. No.: 915,679

[22] Filed: Jul. 21, 1992

[51] Int. Cl.$^5$ .............................................. B62B 9/20
[52] U.S. Cl. .................................. 16/126; 280/655.1; 280/47.315; 280/47.371; 403/93; 403/95; 16/329
[58] Field of Search ............... 280/655.1, 638, 639, 280/643, 651, 657, 658, 47.315, 47.36, 47.371; 403/93, 95, 96; 16/125, 126, 329, 328, 110 R, 111 R, 112

[56] References Cited

U.S. PATENT DOCUMENTS

| 146,776 | 1/1874 | Nichols | 16/329 |
|---|---|---|---|
| 5,005,255 | 4/1991 | Paré et al. | 16/126 |
| 5,039,118 | 8/1991 | Huang | 280/47.371 |
| 5,056,805 | 10/1991 | Wang | 280/47.371 |
| 5,062,179 | 11/1991 | Huang | 280/47.371 |
| 5,543,007 | 9/1985 | Quiogue | 403/93 |

FOREIGN PATENT DOCUMENTS 0531818  1/1958  Italy .................................. 280/655.1

Primary Examiner—Richard M. Camby
Attorney, Agent, or Firm—Varndell Legal Group

[57] ABSTRACT

An adjustable baby cart handrail positioning device including an arched handrail pivotably connected between two supports by two connecting devices. Each connecting device includes a connecting member connected between a circular holder on either support and a circular block on either end of the arched handrail through respective toothed joints, a socket received in an outer hole on the circular block, a first spring retained between the connecting member and the circular holder, a second spring retained between the circular block and the socket, and a screw rod and locknut set to secure the connecting member, the first and second springs and the socket in place. Pressing the socket causes the connecting member to disengage from the circular block permitting the handrail to be rotated on the supports for adjusting its angular position.

1 Claim, 3 Drawing Sheets

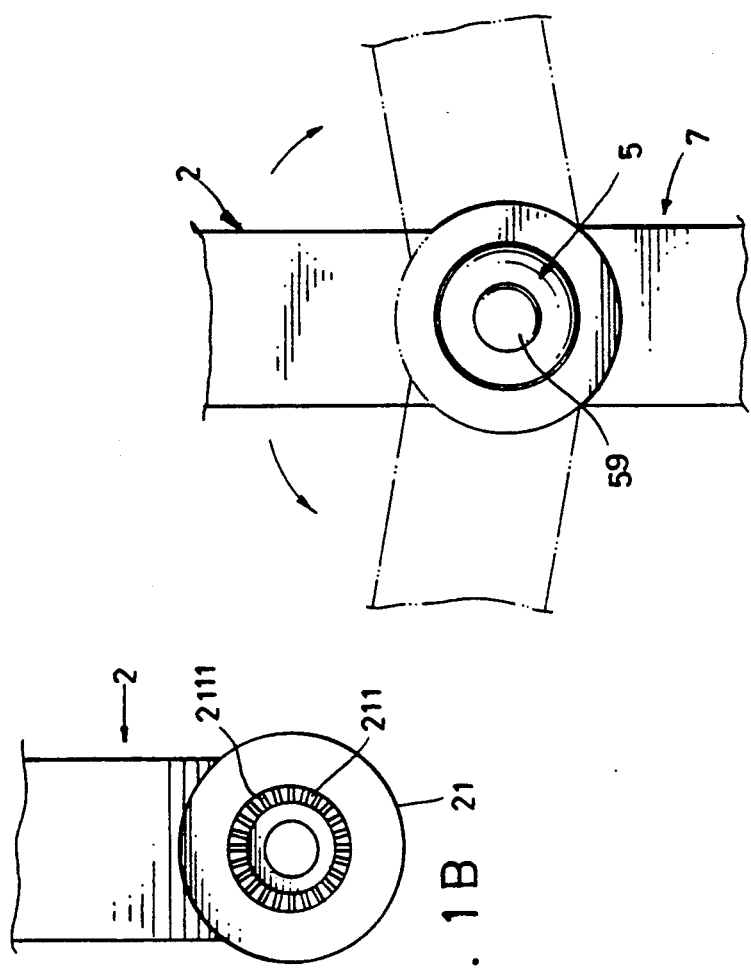
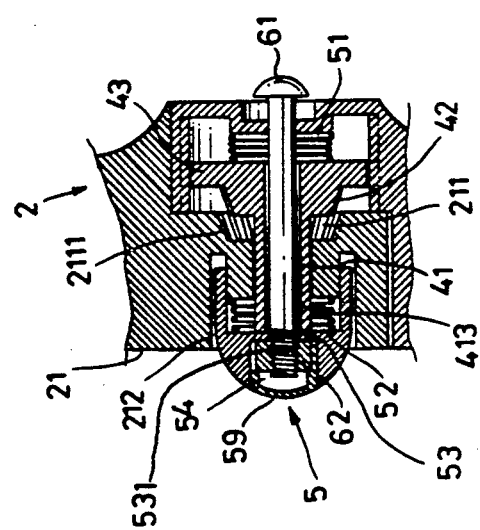

1

ADJUSTABLE BABY CART HANDRAIL POSITIONING DEVICE

BACKGROUND AND SUMMARY OF THE INVENTION

The present invention relates to handrail positioning devices and more particularly to a handrail positioning device for fastening a baby cart's handrail in place permitting it to be conveniently adjusted to the desired angle.

A baby cart generally has a plurality of handrails and handlebars for grasping with the hands. Once a baby cart is made, the handrails and handlebars are fixed at fixed angles and can not be adjusted anymore.

The present invention is to provide an adjustable baby cart handrail positioning device which permits a handrail or handlebar to be conveniently adjusted to any desired angle for comfortable grasping with the hands and for changing the inside serving space of a baby cart. According to the present invention, a connecting device is supported by a spring and connected between either end of the handrail to be connected and a support by respective toothed joints, a socket is sleeved on a tubular front end of the connecting member and supported on the handrail by a spring, and a screw rod and locknut set is used to connect the connecting member and the socket to the handrail and the support. Pressing the socket with the fingers causes the connecting member to disengaged from teeth on the handrail, and therefore the handrail can be rotated on the support for adjusting its angular position. Releasing the fingers from the socket causes the springs to move the connecting member and the socket back to their original positions, and therefore the connecting member becomes engaged with the handrail again.

BRIEF DESCRIPTION OF THE DRAWINGS

FIG. 1B is a side view of the circular block of the curved rod of the adjustable handrail positioning device showing the arrangement of the teeth on the toothed inner hole.

FIG. 2B illustrates that pressing the socket causes the bevel gear to disengage from the teeth on the toothed inner hole of the circular block.

FIG. 3 is a plain view showing that the curved rod can be rotated on the support to adjust its angular position.

DETAILED DESCRIPTION OF THE PREFERRED EMBODIMENT

Figure 1A:
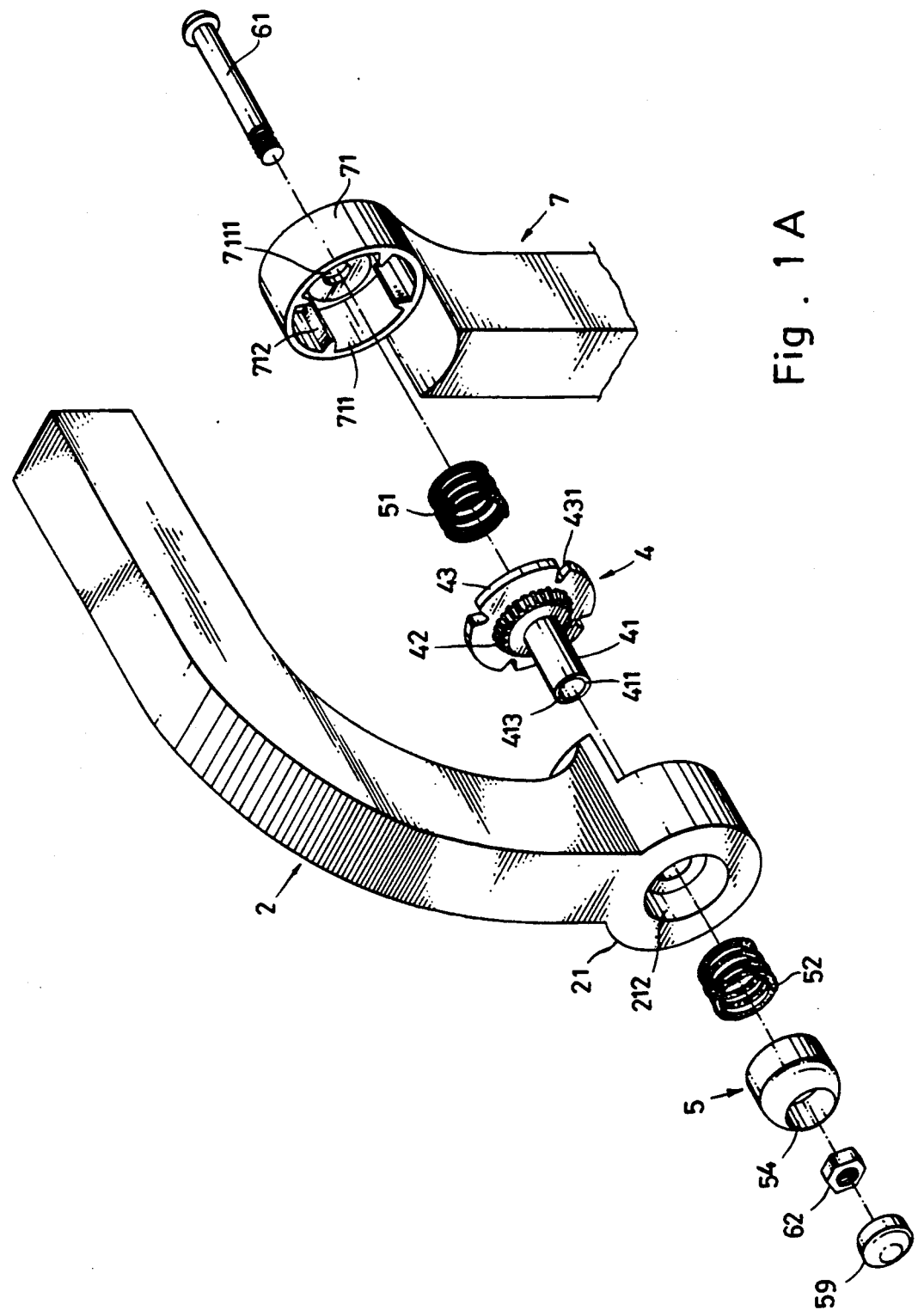
FIG. 1A is an exploded view of an adjustable handrail positioning device according to the present invention.
Figure 2A:
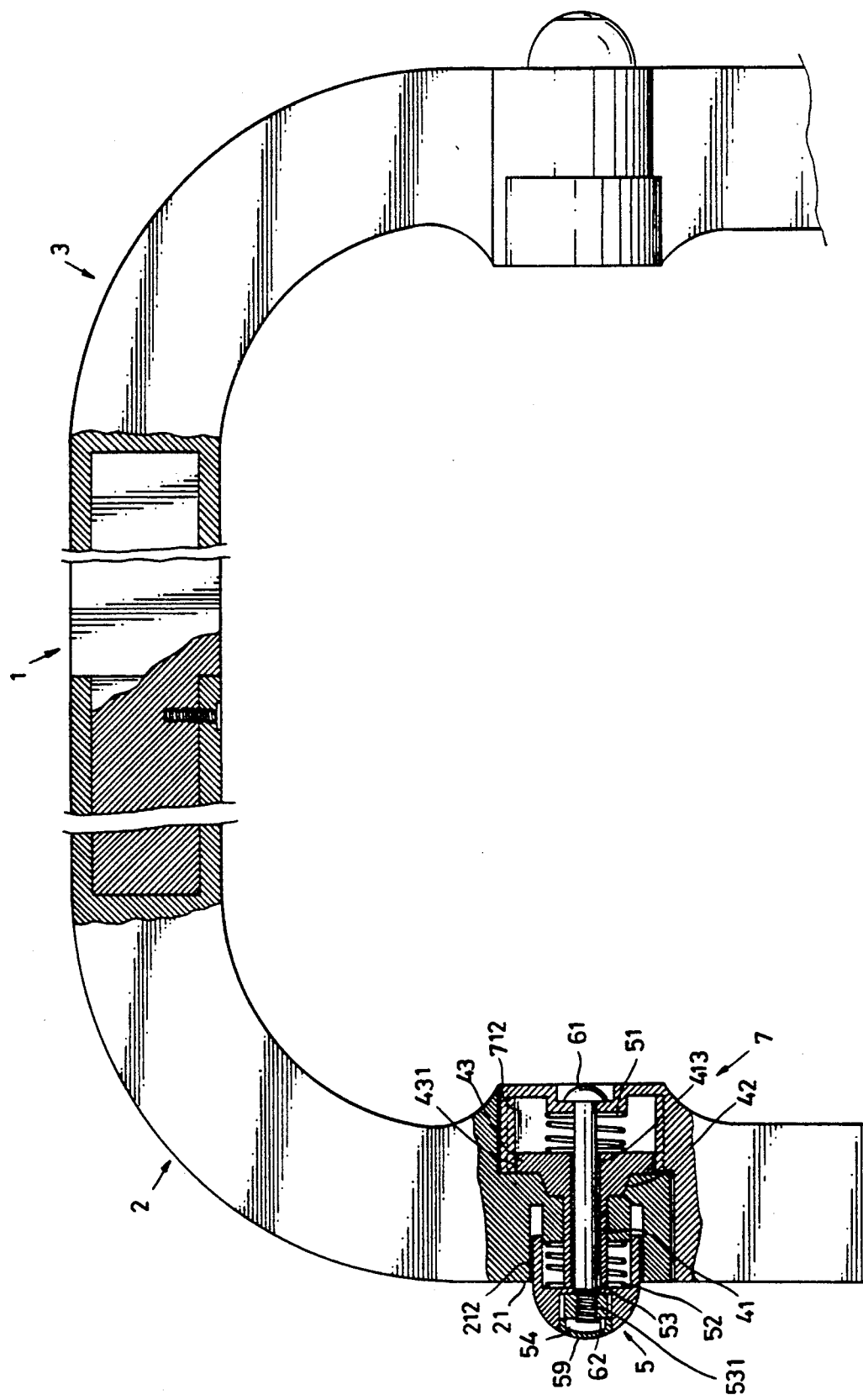
FIG. 2A is a sectional assembly view of the adjustable handrail positioning device.

Referring to FIGS. 1A and 2A, a handrail is made in an arched shape comprised of two curved rods 2, 3 on two opposite ends respectively connected to two supports 7, and a transverse rod 1 on the middle connected between the two curved rods 2, 3. The curved rod 2 or 3 has one end terminated into a circular block 21 connected to either support 7 by a connecting member 4, a socket 5, a plug cap 59, a first compression springs 51, a second compression spring 52, a screw bolt 61 and a locknut 62. The circular block 21 has an outer hole 212 and a toothed inner hole 211 longitudinally aligned. The outer hole 212 is relatively bigger than the toothed inner hole 211. The toothed inner hole 211 has a set of teeth 2111 around the inside surface thereof. Each support 7 has a circular holder 71 on the top to hold a connecting member 4. The circular holder 71 has a receiving chamber 711 which receives the first compression spring 51 and the connecting member 4, a plurality of raised strips 712 on the inside spaced around the receiving chamber 711, and a through hole 7111 through the receiving chamber 711. The connecting member 4 comprises a tube 41 on one end, a notched wheel 43 on an opposite end, and a bevel gear 42 connected therebetween, wherein the tube 41 has a boring bore 413 through the center of the notched wheel 43; the notched wheel 43 has a plurality of notches 431 spaced around the peripheral edge thereof into which the raised strips 712 are engaged respectively. The socket 5 has a big recessed hole 53 on one end which receives the second compression spring 52, a small recessed hole 54 on an opposite end which receives the locknut 62 and sealed by the plug cap 59, and a center hole 531 connected between the big recessed hole 53 and the small recessed hole 54 through which the screw bolt 61 is inserted.

Referring to FIGS. 1B and 2B, the screw bolt 61 is inserted through the through hole 7111, the first compression spring 51, the boring bore 413 of the connecting member 4, the toothed inner hole 211 and the outer holes 212 of the circular block 21 and the center hole 531 of the socket 5 and locked with the locknut 62 in the small recessed hole 54 of the socket 5 to connected the support 7 to the curved rod 2 or 3, and then the plug cap 59 is inserted in the small recessed hole 54 to conceal the locknut 62. After connection, the first compression spring is received inside the receiving chamber 711 and stopped against the notched wheel 43 of the connecting member 4; the second compression spring 52 is received inside the outer hole 212 of the circular block 21 and the big recessed hole 53 on the socket 5; the tube 41 of the connecting member 4 is inserted through the toothed inner hole 211 of the circular block 21 into the big recessed hole 53 of the socket 5 with the end edge 411 thereof stopped against a partition wall (not shown) inside the socket 5 permitting the bevel gear 42 to be meshed with the teeth 2111 on the toothed inner hole 211 of the circular block 21 (see FIG. 1B). By means of the aforesaid arrangement, the curved rod 2 or 3 is fastened to the respective support 7 at a fixed angle.

Referring to FIG. 3 and seeing FIGS. 1B, 2A and 2B again, pressing the socket 5 inwards toward the support 7 with the fingers causes the bevel gear 42 to disengage from the teeth 2111 on the toothed inner hole 211 of the circular block 21, and therefore the curved rod 2 can be rotated to adjust its angular position on the support 7. Once the socket 5 is released from the fingers, the first and second compression springs 51, 52 automatically and respectively move the connecting member 4 and the socket 5 back to their original positions causing the bevel gear 42 to mesh with the teeth 2111 again, and therefore the curved rod 2 becomes firmly retained at the adjusted angle.

I claim:

1. An adjustable baby cart handrail positioning device comprising an arched handrail connected between two supports by two connecting devices, said arched handrail comprised of two curved rods on two opposite ends and a transverse rod connected therebetween, said curved rods having each one end terminated into a circular block connected to a circular holder on each of the two supports by a respective connecting device, said circular block having a small toothed inner hole and a big outer hole longitudinally aligned, said small toothed inner hole having a plurality of teeth around an inside surface thereof, said circular holder comprising a cup-like receiving chamber, a plurality of raised strips spaced around said receiving chamber and a through hole through said cup-like receiving chamber, said connecting devices being each comprised of a first spring means, a second spring means, a connecting member, a socket, a screw bolt, a locknut and a plug cap, said screw bolt being inserted in proper order through the through hole in said circular block, a hole in said first spring means, a hole in said connecting member, the small toothed inner hole ad big outer hole in said circular block, a hole in said second spring means and a hole in said socket and locked up with said locknut, said plug cap being fastened to said socket to conceal said locknut, said connecting member comprising a tube on one end inserted through said small toothed inner hole and said big outer hole of said circular block and the hole in said second spring means into the hole in said socket and stopped against a partition wall inside said socket, a notched wheel on an opposite end received inside said receiving chamber on said circular holder and meshed with said raised strips, and a bevel gear between said tube and said notched wheel releasably meshed with the teeth on said small toothed inner hole, wherein pressing said socket inwards toward the respective support causes said bevel gear to disengage from the teeth on the small toothed inner hole of said circular block permitting the respective curved rod to be rotated on the respective support for changing the angular position.

* * * * *